United States Patent [19]

Harendza-Harinxma

[11] 3,961,025

[45] June 1, 1976

[54] METHOD OF CARBONIZING A SUBSTANCE COMPRISING CELLULOSE

[76] Inventor: Alfred J. Harendza-Harinxma, 50 Merion Place, Lawrenceville, N.J. 08648

[22] Filed: Dec. 19, 1974

[21] Appl. No.: 534,642

[52] U.S. Cl. .............................. 423/415 R; 201/25; 423/449; 423/453; 423/461
[51] Int. Cl.² .......................................... C01B 31/00
[58] Field of Search .......... 423/445, 449, 461, 453, 423/415, 415 A; 264/29; 252/425, 430; 201/2.5, 17, 25

[56] References Cited
UNITED STATES PATENTS

| | | | |
|---|---|---|---|
| 3,298,928 | 1/1967 | Estever | 201/2.5 X |
| 3,676,365 | 7/1972 | Shirai et al. | 201/2.5 X |
| 3,725,538 | 4/1973 | Brewer | 423/461 X |

*Primary Examiner*—L. Dewayne Rutledge
*Assistant Examiner*—Michael L. Lewis

[57] ABSTRACT

A method of treating municipal waste which contains cellulose comprises combining the waste with an alkali metal meta-aluminate, such as sodium aluminate, to form a carbonizing mixture and then heating the carbonizing mixture, in air, to carbonize the waste material.

12 Claims, 1 Drawing Figure

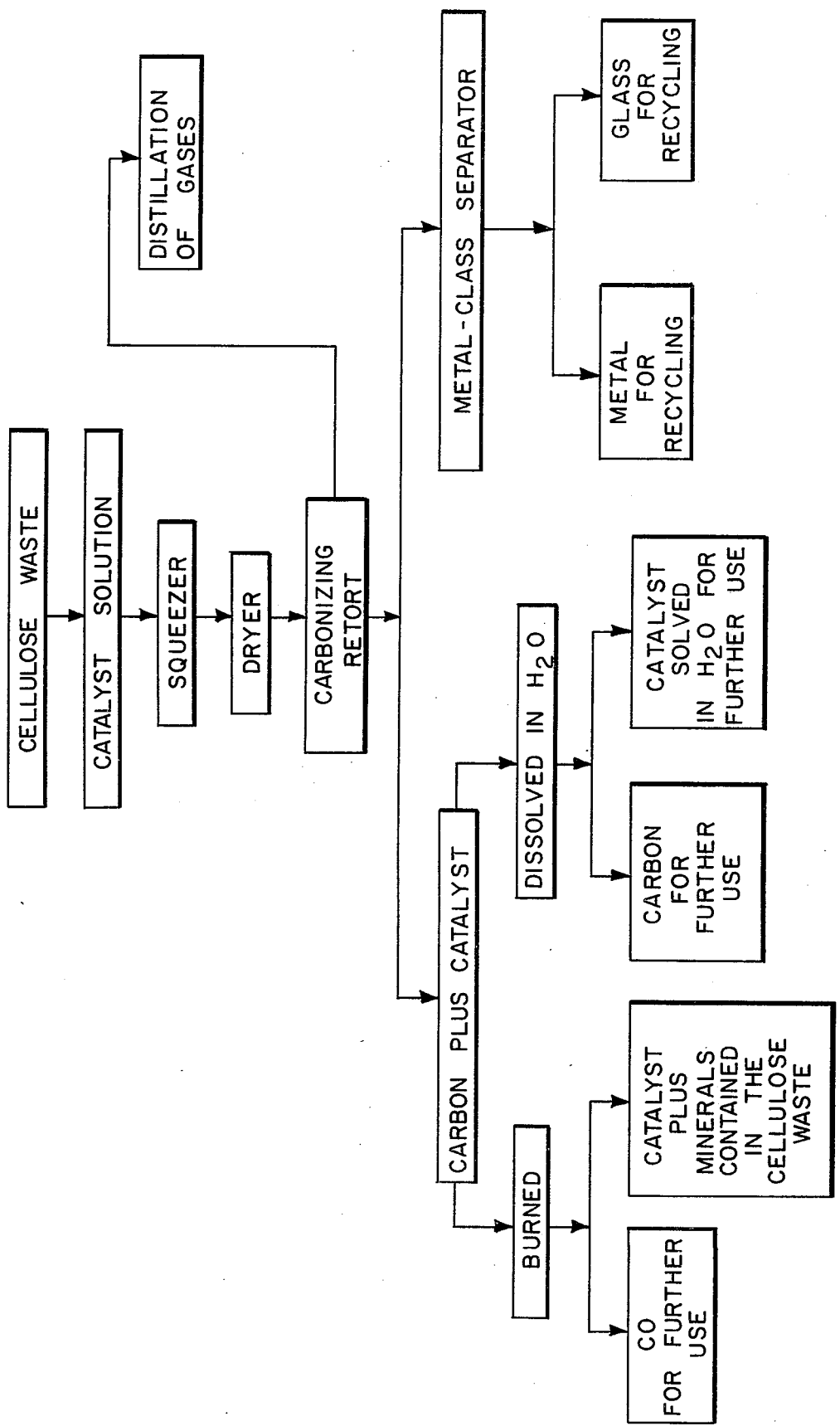

1

METHOD OF CARBONIZING A SUBSTANCE COMPRISING CELLULOSE

BACKGROUND OF THE INVENTION

1. Field of the Invention

This invention relates to a method of carbonizing a substance comprising cellulose and more particularly, to a method of carbonizing cellulose containing waste products with an alkali metal aluminate.

2. Description of the Prior Art

"Municipal solid waste" as that term is used herein will be understood as referring to raw refuse such as domestic rubbish and garbage of the type which is discarded within municipalities and handled by collection and disposal systems. It will be understood that although the term suggests only such waste as is collected by a municipality and/or treated by a municipality, the present invention is applicable to and includes such solid waste material whether or not a municipality has been involved in its collection or treatment.

Municipal solid waste although variable from time to time and from place to place has been analyzed to be of the following average composition:

| | |
|---|---|
| Paper, cardboard, etc. | 50–70% |
| Miscellaneous organics, such as plastic, wood, food products, etc. | 10–20% |
| Nonmetallic materials such as metallic oxides, glass, earth ceramics, etc. | 10–20% |
| Ferrous metals such as iron and steel | 5–10% |
| Nonferrous metals such as copper, aluminum, zinc, etc. | 0.2–1% |

A technique whereby cellulose containing materials can be completely carbonized or charred without leaving a residue, i.e., without incineration and formation of an ash, is desirable. The carbonization of cellulose waste is a well known process. However, the catalysts employed to achieve such carbonization have heretofore been water insoluble and acids had to be used to separate the carbon from the catalyst. Also, high pressures are necessary.

A process whereby carbonization of cellulose waste with a water soluble catalyst is desired and is an object of the subject invention.

Summary of the Invention

The present invention is directed to a method of carbonizing a substance comprising cellulose and more particularly, to a method of carbonizing cellulose containing waste products with an alkali metal aluminate.

The method includes combining the substance with an alkali metal aluminate to form a carbonizing mixture. The carbonizing mixture is then heated to carbonize the substance.

Description of the Drawing

The present invention will be more readily understood by reference to the following drawing wherein the FIGURE is a general flow-chart of the novel process of the invention.

Detailed Description

The present invention has been described largely in terms of carbonizing cellulose containing materials or substances with sodium aluminate. However, it will be understood that such description is exemplary only and does not limit the subject invention. It will be readily appreciated that the invention concept described is equally applicable to aluminates selected from among other alkali metal aluminates such as Li, K, Rb, Cs, etc.

A substance comprising cellulose ($C_6H_{10}O_5$) is first treated with a suitable carbonizing catalyst. Some typical materials comprising cellulose include vegetable matter, wood, cotton, wool, paper, wood pulp, etc. A suitable carbonizing catalyst comprises an alkali metal aluminate $LiAlO_2$, $KAlO_2$, $NaAlO_2$, etc. The cellulose containing substance is treated by intimately mixing the carbonizing catalyst therewith. A preferred method of mixing includes dissolving the alkali metal aluminate in an aqueous solution which is used as a carrier medium. The substance to be treated is then intimately wetted by the catalyst solution, employing techniques well known in the art such as immersion, spraying, etc. to form a carbonizing mixture or solution.

It is to be noted that the concentration of the alkali metal aluminate in solution is not critical; but an amount thereof should be present sufficient to (1) combine with the cellulose containing substance and (2) carbonize the substance at a selected temperature to which the mixture is destined to be heated. Typically, the concentration of the alkali metal aluminate solution ranges from about 6 weight percent of the alkali metal aluminate to saturation of the aqueous solution at a particular temperature. A suitable temperature typically ranges from 70°C to the boiling point of the carbonizing catalyst solution (at atmosphere of pressure or above).

Next, the substance together with the catalyst is dried using any conventional techniques known in the art, e.g., air drying, vacuum drying, etc. Next, the now dried carbonizing mixture, comprising a cellulose-containing substance combined with the alkali metal aluminate, is heated in air at a suitable temperature for a period of time sufficient to completely carbonize the cellulose containing substance. The period of time required to completely carbonize the substance is dependent upon the amount the material to be carbonized and the temperature employed. It is, of course, understood that the period of time required is readily ascertained experimentally by one skilled in the art. Complete carbonization or charring occurs with the formation of carbon, without ignition or combustion and thus without the formation of an ash from the cellulose containing substance.

During the heating and carbonizing step, gaseous products are given off, typically comprising $CO_2$, CO, $H_2$, $CH_4$, etc. These gaseous products which are at an elevated temperature above 25°C may be used as a heating means. Alternatively, the gaseous products can be condensed and the products collected for other uses such as chemical useage, etc.

The direct mixture contaning carbon and the carbonizing catalyst, e.g., $NaAlO_2$, $KAlO_2$, $LiAlO_2$, etc. is then washed with water and filtered whereby the alkali metal aluminate is dissolved and the insoluble carbon is filtered away and separated.

Alternatively, the dried mixture may be placed in a suitable vessel, e.g., a retort, and is heated to a temperature, typically 300° to 600°C, whereby all of the carbonized material or carbon is oxidized to form a gaseous oxidation product such as carbon monoxide (CO). For this latter purpose the air can be controlled. The alkali metal aluminate carbonizing catalyst remains essentially intact and is separated from the carbonized product and is thus available for continued and repeated use.

Where waste products, such as municipal waste, are to be treated, reference is now made to the figure (general flow-chart). Solid waste material comprising among other things (1) cellulose containing substances (cellulose waste) such as wood, vegetables, wool, paper, etc., (2) metals, (3) glass, is sent to a processing site whereat it is fed into a suitable container. For illustrative purposes only a typical suitable container comprises a rectangular metal basket, such as an iron or steel basket, composed of a heavy, meshlike construction. It is to be understood that the size, shape and type of container is not important to practice the subject invention and the subject invention should not be limited thereby.

The selected container is filled with the cellulose containing waste material and then treated, e.g., by dipping in an aqueous solution of an alkali metal aluminate bath, (an 8 weight percent $NaAlO_2$ aqueous solution) maintained at an elevated temperature, above 50°C (70°C). A stirrer may be employed to rotate the waste in the carbonizing solution, until all the waste material is wetted by or soaked by the carbonizing catalyst solution. In this regard it is to be noted that the waste material may be pre-treated prior to immersion in the solution, whereby, wetting thereof is accomplished more rapidly and efficiently. A typical pre-treatment comprises dicing or shredding the waste material.

After the waste material has been completely wetted and intimately mixed with the carbonizing catalyst solution, e.g., an $NaAlO_2$ aqueous solution, the container is removed from the solution. In turn the wetted waste material is removed from the drum and is removed of excess solution by a draining technique, e.g., by the application of pressures above atmospheric, whereby excess carbonizing catalyst solution is removed to form a carbonizing mixture comprising the cellulose containing waste material intimately mixed with the carbonizing catalyst. The resultant mixture is next fed into a heated container or carbonizing retort, e.g., a heavy duty iron or steel mesh drum, which is positioned at a suitable angle, e.g., typically at an angle of about 15°. The angled drum is slowly rotated so that the mixture which is full to the elevated position of the drum moves slowly, through the rotation of the drum, in a helical path to the opposite end of the drum. The drum and thus the introduced mixture is heated to a temperature sufficient to carbonize any cellulose containing material contained in the waste mixture. A typical temperature sufficient for such carbonization ranges from 250°C to 600°C.

During the carbonizing process, gaseous products are evolved comprising $CO_2$, $CO_1$, $H_2$, $CH_9$, etc. Therefore, the rotating drum or carbonizing retort can be designed employing standard techniques known in the art whereby those gaseous products, which are at an elevated temperature (e.g., typically 250°C) are re-cycled to aid in the heating of the rotating drum or carbonizing retort.

The waste substances or materials comprising cellulose are carbonized or charred without ignition, even at such elevated temperatures of 250°C – 600°C, which is a surprising and unexpected result, and which is due to the unique alkali metal aluminate carbonizing catalyst.

The resultant carbonized product (carbon) is very brittle and disintegrates during the rotation process and falls through the interstices of the mesh-like retort or drum leaving behind only solid materials such as metals, glass, mineral matter, etc. The resultant carbonized waste mixture may be removed from the retort and placed in a fine-meshed screened shaker which accomplishes the separation.

The separated metals, glass, etc. are brought to a conventional separator and separated using known processes which will not be elaborated upon herein. The separated carbonized mixture comprising carbon and the alkali metal catalyst is collected in containers and shipped to a central plant. There, the carbon can be used as a basic material for the manufacture of other chemical products or as an adsorbent for gases or as a filler in the production of rubber, etc. The carbon-catalyst mixture can be burned or heated, e.g., typically at about 400°C by controlled atmosphere, to produce carbon monoxide (CO). The carbon monoxide in turn can be used to produce synthetic gasoline for example using processes and techniques well known in the art and which will not be elaborated upon herein.

Alternatively, the carbon-catalyst mixture may be treated with water which dissolves only the alkali metal aluminate catalyst. The carbon can then be separated from the dissolved catalyst as by filtering. The separated carbon can then be stored for further use in some conventional fashion to produce other chemical products. The dissolved and separated alkali metal aluminate has not been chemically altered in any fashion and can be stored in the form of the solution or recrystallized, thereby enabling the same catalyst to be used repeatedly in the treatment of cellulose containing substances (waste) to achieve carbonization thereof without inumeration.

EXAMPLE I 1,000 grams of solid waste comprising cellulose containing material including paper and common waste vegetable matter was dipped into an aqueous saturated solution of sodium aluminate. The cellulose containing waste material was saturated with the sodium aluminate solution which was maintained at a boiling temperature. After 5 minutes at 300°C the cellulose containing material was carbonized without burning to form black carbon.

The resultant carbon containing mixture was then ground and heated to a temperature of 600°C in air to form a gaseous carbon oxidation product (without burning) thereby leaving only a white skeleton of sodium aluminate which dissolved in water.

EXAMPLE II 1,000 grams of solid waste paper (cellulose) was placed in a screened container. The container was then dipped in an aqueous solution comprising about 6 weight percent of sodium aluminate ($NaAlO_2$). The solution was maintained at a temperature of 90°C. After 10 minutes the screened container was removed from the solution, whereafter the wetted waste material was removed therefrom and put into a press to remove excess sodium aluminate solution. The waste material was then dried at about 120°C for 15 minutes and then placed in a retort. The material was heated in the retort at a temperature slightly above 250°C for 15 minutes thereby carbonizing the cellulose containing waste to form carbon without ignition of the waste. The resultant carbon containing mixture was then heated to a temperature of about 400°C to form gaseous carbon monoxide. A residue of white sodium aluminate remained in the retort.

EXAMPLE III 1,000 grams of solid waste material (cellulose) was placed in a screened container. The container was then dipped in an aqueous solution comprising about 8 weight percent of sodium aluminate.

The solution was maintained at a temperature of 80°C. After 15 minutes the screened container was removed from the solution, whereafter the wetted waste material was removed therefrom and put into a press to remove excess sodium aluminate solution.

The waste material was then dried at about 150°C for 10 minutes and then placed in a retort. The material was heated in the retort at a temperature slightly above 350°C for 10 minutes thereby carbonizing the cellulose containing waste to form carbon without ignition of the waste. The resultant carbon-sodium aluminate carbonizing mixture was then put in water to dissolve the sodium aluminate. The carbon was filtered, washed with water and preserved for further use.

What I claim is:

1. A method of carbonizing a substance comprising cellulose, which comprises:
    combining the substance with an alkali metal meta aluminate to form a carbonizing mixture; and
    heating said carbonizing mixture to carbonize the substance.

2. The method as defined in claim 1 wherein said alkali metal aluminate comprises sodium meta aluminate.

3. The method as defined in claim 2 wherein said mixture is heated at a temperature ranging from 250° to 700°C.

4. A wet method of carbonizing a cellulose containing substance without ignition thereof, which comprises:
    treating the substance with a solution comprising a dissolved alkali metal meta aluminate; and
    heating said treated substance until said treated substance is carbonized.

5. The method as defined in claim 4 wherein said alkali metal aluminate comprises sodium meta aluminate.

6. The method as defined in claim 4 wherein said treated substance is heated at a temperature ranging from 250° to 700°C.

7. A method for treating solid waste material containing cellulose which comprises:
    treating the solid waste material with an aqueous solution comprising a dissolved alkali metal meta aluminate;
    heating said treated solid waste material to carbonize the material comprising cellulose to form carbon; and
    separating said formed carbon from remaining solid waste material.

8. The method as defined in claim 7 which further comprises heating said formed carbon in an oxygen containing ambient to form a gaseous oxidation product.

9. The method as defined in claim 7 wherein said alkali metal meta aluminate comprises sodium aluminate.

10. The method as defined in claim 7 wherein said treated solid waste material is heated at 250°C to 700°C.

11. The method according to claim 7 further comprising the step of:
    prior to said heating step, dissolving the sodium aluminate in water thereby to produce a pure carbon.

12. The method as defined in claim 8 wherein said heating is at a temperature of at least 250°C.

* * * * *